US008639756B2

(12) United States Patent
Boström et al.

(10) Patent No.: US 8,639,756 B2
(45) Date of Patent: Jan. 28, 2014

(54) METHOD AND APPARATUS FOR GENERATING A RELEVANT SOCIAL GRAPH

(75) Inventors: Jani Boström, Helsinki (FI); Martin Jansky, Espoo (FI); Kristian Luoma, Kiviniemi (FI); Olli Immonen, Helsinki (FI); Juha Arrasvuori, Tampere (FI); Elina Ollila, Kirkkonummi (FI); Yanqing Cui, Helsinki (FI); Akos Vetek, Helsinki (FI)

(73) Assignee: Nokia Corporation, Espoo (FI)

( * ) Notice: Subject to any disclaimer, the term of this patent is extended or adjusted under 35 U.S.C. 154(b) by 447 days.

(21) Appl. No.: 12/708,582

(22) Filed: Feb. 19, 2010

(65) Prior Publication Data

US 2011/0208814 A1    Aug. 25, 2011

(51) Int. Cl.
*G06F 15/16* (2006.01)

(52) U.S. Cl.
USPC ........................................ 709/204

(58) Field of Classification Search
USPC .......... 709/203, 204, 205, 217, 219, 223, 224
See application file for complete search history.

(56) References Cited

U.S. PATENT DOCUMENTS

| 2003/0167324 | A1* | 9/2003 | Farnham et al. ............... 709/224 |
| 2006/0209690 | A1 | 9/2006 | Brooke |
| 2009/0024747 | A1 | 1/2009 | Moses et al. |
| 2009/0138460 | A1 | 5/2009 | Gorti et al. |
| 2009/0157312 | A1 | 6/2009 | Black et al. |
| 2009/0177744 | A1 | 7/2009 | Marlow et al. |
| 2009/0222448 | A1 | 9/2009 | Caldwell et al. |
| 2009/0265242 | A1* | 10/2009 | Horvitz et al. .............. 705/14.52 |
| 2010/0058196 | A1* | 3/2010 | Krishnan et al. ............... 715/747 |
| 2010/0082695 | A1 | 4/2010 | Hardt |
| 2010/0199192 | A1* | 8/2010 | Sittig et al. ..................... 715/751 |
| 2010/0228726 | A1* | 9/2010 | Slinker et al. .................. 707/723 |
| 2010/0235886 | A1 | 9/2010 | Muller et al. |
| 2010/0268830 | A1* | 10/2010 | McKee et al. .................. 709/228 |
| 2011/0087968 | A1* | 4/2011 | Lakshmanan et al. ......... 715/751 |
| 2012/0096038 | A1* | 4/2012 | Sittig et al. .................... 707/784 |

FOREIGN PATENT DOCUMENTS

| EP | 1 622 328 A1 | 2/2006 |
| EP | 2 107 516 A1 | 10/2009 |
| GB | 2474126 A | 4/2011 |

OTHER PUBLICATIONS

"Find friends on Facebook," http://www.butterscotch.com/tutorial/Find-Friends-On-Facebook, Oct. 28, 2008.
"Force-based algorithms (grapch drawing)," Wikipedia article, http://en.wikipedia.org/w/index.php?title=Force-based_algorithms_(graph_drawing)&oldid=343928579, Feb. 14, 2010.
"Visualization of twitter social graphs," http://dudarev.com/blog/, Jan. 11, 2009.

(Continued)

*Primary Examiner* — Barbara Burgess
(74) *Attorney, Agent, or Firm* — Ditthavong Mori & Steiner, P.C.

(57) ABSTRACT

An approach is provided for generating a relevant social graph. A social graph identifying people associated with a user is retrieved. A communication history from a device associated with the user is retrieved. Information regarding a respective occurrence of each identified person in the communication history is determined. A relevant social graph is generated based, at least in part, on the determined occurrence information.

12 Claims, 11 Drawing Sheets

(56) References Cited

OTHER PUBLICATIONS

Chin, "Finding Cohesive Subgroups and Relevant Members in the Nokia FriendView Mobile Social Network, International Conference on Computational Science and Engineering," Aug. 29-31, 2009, pp. 278-283.

Huang, "Supporting Meaningful Social Networks," University of Southampton, Thesis submitted in partial fulfillment for the degree of Doctor of Philsophy in the Faculty of Engineering, Jun. 15, 2009, pp. 1-156.

International Search Report for corresponding PCT Application No. PCT/FI2011/050046, Jun. 3, 2011, pp. 1-5.

Wilson, et al, "User Interactions in Social Networks and their Implications," EuroSys '09, Apr. 1-3, 2009, pp. 1-14.

Written Opinion for corresponding PCT Application No. PCT/FI2011/050046, Jun. 3, 2011, pp. 1-11.

U.S. Appl. No. 12/425,904, filed Apr. 17, 2009, Toni Paila et al.

Grob, R. et al., Cluestr: Mobile Social Networking for Enhanced Group Communication, Accessed: Apr. 23, 2010, http://distcomp.ethz.ch/publications/group09.pdf, 10 pages.

Groups: Drag & Drop Contacts Management, Group Email, Smart Contact Filters, Map Contacts, Accessed: Apr. 23, 2010, http://www.macworld.com/appguide/app.html?id=89373, 17 pages.

Linked Internet UI Concept. Accessed: Apr. 23, 2010, http://research.nokia.com/research/linkedui, 2 pages.

Manage Your Social Networks in One Place With Pond. Accessed: Apr. 23, 2010,http://www.makeuseof.com/tag/manage-your-social-networks-in-one-place-with-pond-100-invites/, 20 pages.

TouchGraph Navigator. Accessed: Apr. 23, 2010, http://www.touchgraph.com/navigator.html, 2 pages.

\* cited by examiner

640

METHOD AND APPARATUS FOR GENERATING A RELEVANT SOCIAL GRAPH

BACKGROUND

Service providers (e.g., wireless, cellular, etc.) and device manufacturers are continually challenged to deliver value and convenience to consumers by, for example, providing compelling network services. One area of interest has been the development of social networking services and other services for making connections among users. The totality of these connections and relationships among users are commonly known as social graphs. For example, a social graph can be created on a user-by-user basis to represent links created by a particular user over one or more social networking services. However, because social networking services often make it very easy for a user to create such connections, a user's social graph can expand quickly from a core group of close friends to a much larger and potentially cumbersome group (e.g., a group that includes friends of friends, minor acquaintances, or even complete strangers). Accordingly, service providers and device manufacturers face significant technical challenges in maintaining such social graphs while providing means for a user to quickly identify those individuals in the user's social graph that are of most relevance. Many of these services provide social networking aspects and services. As such, social networking services are provided by many service providers. These social networking services can be based on relationships between users. For example, the social networking site Facebook® provides for relationships between users as friendships. Over time, users collect many friends and grow their friend circle. Many of these friends may be friends from different aspects of the user's life (e.g., from college, from a trip, from work, etc.). As such, the user may have limited contact with many of the friends. Thus, some of these friends may be irrelevant to the user's real life.

SOME EXAMPLE EMBODIMENTS

Therefore, there is a need for an approach for generating a relevant social graph based on communication patterns.

According to one embodiment, a method comprises retrieving a social graph identifying people associated with a user. The method also comprises retrieving a communication history from a device associated with the user. The method further comprises determining information regarding a respective occurrence of each identified person in the communication history. The method further comprises generating a relevant social graph based, at least in part, on the determined occurrence information.

According to another embodiment, an apparatus comprising at least one processor, and at least one memory including computer program code, the at least one memory and the computer program code configured to, with the at least one processor, cause, at least in part, the apparatus to retrieve a social graph identifying people associated with a user. The apparatus is also caused to retrieve a communication history from a device associated with the user. The apparatus is further caused to determine information regarding a respective occurrence of each identified person in the communication history. The apparatus is additionally caused to generate a relevant social graph based, at least in part, on the determined occurrence information.

According to another embodiment, a computer-readable storage medium carrying one or more sequences of one or more instructions which, when executed by one or more processors, cause, at least in part, an apparatus to retrieve a social graph identifying people associated with a user. The apparatus is also caused to retrieve a communication history from a device associated with the user. The apparatus is further caused to determine information regarding a respective occurrence of each identified person in the communication history. The apparatus is additionally caused to generate a relevant social graph based, at least in part, on the determined occurrence information.

According to another embodiment, an apparatus comprises means for retrieving a social graph identifying people associated with a user. The apparatus also comprises means for retrieving a communication history from a device associated with the user. The apparatus further comprises means for determining information regarding a respective occurrence of each identified person in the communication history. The apparatus further comprises means for generating a relevant social graph based, at least in part, on the determined occurrence information.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for generating and utilizing a relevant social graph are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
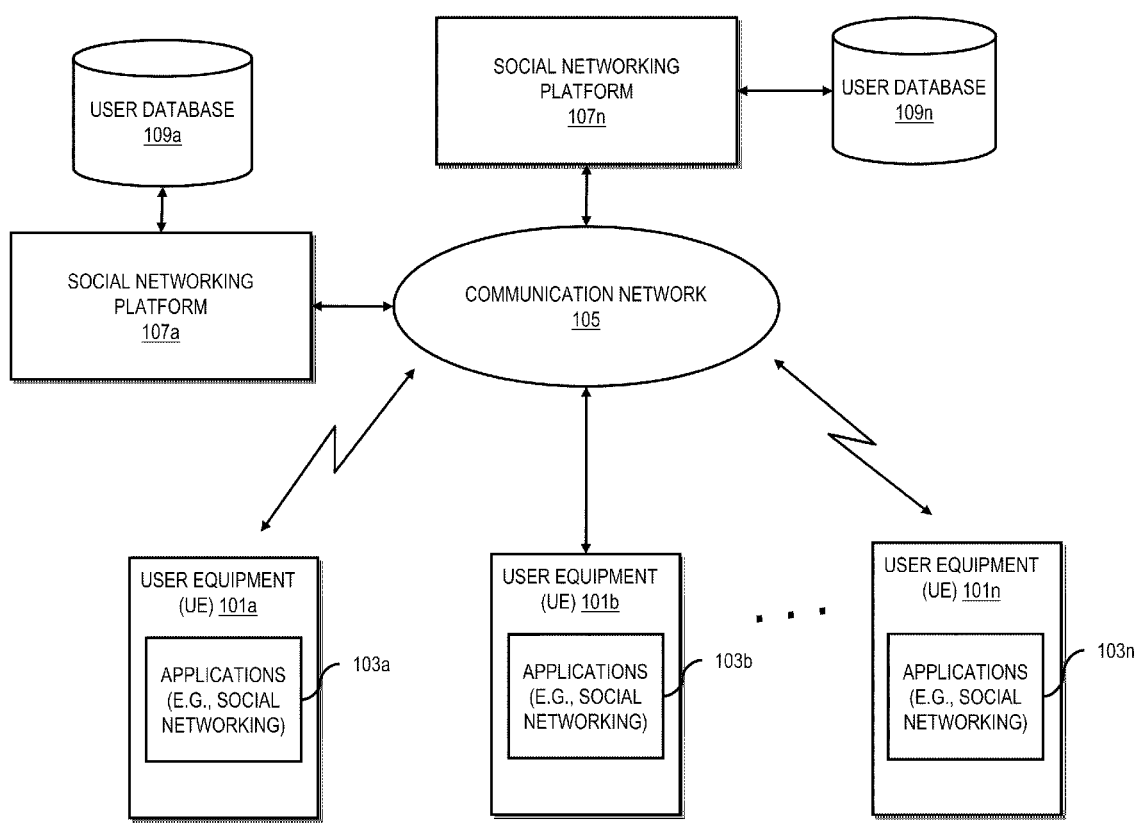
FIG. 1 is a diagram of a system capable of generating a relevant social graph, according to one embodiment.

FIG. 1 is a diagram of a system capable of generating a relevant social graph, according to one embodiment. In certain embodiments, a social graph is a data structure or a group of data structures (e.g., list, table, etc.) that stores connection and relationship information between users (e.g., connections via accounts of users or members of a social networking service). For example, groups (e.g., family, friends, colleagues, co-workers, acquaintances, etc.) may be depicted or described as associations within information stored about the user. Further, social graphs can be extracted from social networking services and/or generated by identifying and linking relationships based on contact information.

Social network build-up is generally based upon user driven manual invitations and linking new friends to a user's social graph. Thus, the construction of social graphs can be reliant on searches and recommendations based on comparing various contact lists (e.g., recommending friends of friends). For example, a typical daily utilization of the people in the user's social graph is traditionally based on commenting and sharing media. It is noted, however, that this service landscape is becoming saturated and new forms of social network services and ways of having relationships established are appearing. Further, existing social graphs of users are becoming large and unwieldy. As such, it is becoming difficult to view messages from people on the user's social graph. Further, it is becoming difficult to manage the additions to the user's social graph as well as other status information of other people associated with the user's social graph.

To address this problem, a system 100 of FIG. 1 introduces the capability to generate a relevant social graph. With a relevant social graph, users are able to personalize the use of social networking services to people that the user may determine to be of more relevance or more importance to the user. In certain embodiments, a relevant social graph is a social graph that takes into account real life communications between the user and other people. In some scenarios, the real life communications may be conducted via the UE 101, where the communication history between the user and other users are separate from a particular social networking service. For example, the communications may be via a phone call, a Short Message Service (SMS), Multimedia Messaging Service (MMS), communications via another social networking service, e-mail, chat sessions, etc. Moreover, the communications may include calendar invitations and calendar events. Further, recommendations on adding people to one or more social networking services may be determined based on a relevant social graph. In one embodiment, user equipment (UEs) 101a-101n may be utilized to present social networking applications 103a-103n. These social networking applications 103 can utilize a communication network 105 to communicate to one or more social networking platforms 107a-107n. The social networking platforms 107 can store user information in a user database 109a-109n. Examples of social networking platforms 107 include social networking websites and services (e.g., Facebook™, Twitter™, MySpace™ etc.), as well as other computing devices (e.g., a server to coordinate communications between UEs 101 such as a chatting service). The user information may include user profiles of users, one or more social graphs of the user as well as associations with other users. Further, the user information may additionally include updates from the user and other users (e.g., friends), media content (e.g., images, video, audio, etc.), communications, game content, etc.

As previously noted, the social networking application 103 may be utilized by the UE 101 to provide social networking services to the user. Other applications (e.g., a messaging application, communication history application, contacts application, etc.) may be utilized to communicate, via the UE 101, with other people. In one embodiment, these people may be associated with unique identifiers (e.g., e-mail address, messaging alias identifier, phone number, address, etc.). As such, the UE 101 can store the identifiers as associated with particular communications in, for instance, a communication history. With these identifiers, the social networking application 103 can query social networking platforms 107 to determine if the contacts are part of respective social networking services. For example, the social networking application 103 can utilize an application programming interface (API) of the social networking platforms 107 to determine if the person associated with the communications is a member of the social networking service or services. As part of the query, the user may provide a user name and/or password for social networking services to access the social connection information (e.g., the social graph) within the respective services.

By way of example, the social networking platform 107 retrieves and checks a communication history of the UE 101 to determine one or more occurrences of communications between the user and other users. In certain embodiments, contact information for a person may be stored in a contact database (e.g., a phonebook database, contact list, etc.). As such, the communications using different modes of communication (e.g., e-mail, phone call, chat message, SMS, etc.) can be correlated to determine repeating occurrences of communication between the user and other people. In certain embodiments, repeat occurrences above a certain threshold number of occurrences can be utilized to trigger a search to determine whether the person is part of the user's social graphs in one or more social networking services. In this way, the person's contact information is utilized to query the social networking services to determine whether that person is part of the user's social graph. The social graph, for instance, can be specific to each social networking service to which the user belongs. Further, if the person is not part of the user's social graph for the particular social networking service, the social networking application 103 can add the user to the user's social networking graph for the service. If the person is a member of the social networking service, the user can invite the person to be a member of the user's social graph. If the person lacks membership to the social networking service, the social networking application 103 can send an invitation to the person to join the social networking service via one of modes of communication (e.g., e-mail).

In certain embodiments, the social networking application 103 may access social graphs associated with the user. The social graphs can be tied to individual social networking services, be a combination of graphs of multiple social networking services, be tied to contacts associated with the user without a social networking service, or a combination thereof. The social networking application 103 can generate a relevant social graph based on one or more of the social graphs. To generate the relevant social graph, the social networking application 103 retrieves the communication history from the UE 101. Then, the communication history is parsed to determine one or more occurrences or patterns of occurrences of communications between the user and other people. The people associated with the social graph(s) that are part of the occurrences or patterns of occurrences may be flagged, sorted, etc. in a new relevant social graph. In one example, the relevant social graph includes people that have been in recent communications with the user. In another example, the relevant social graph flags people that have been in recent communications with the user as being relevant. In yet another example, the relevant social graph ranks the social graph based on the communications (e.g., recentness of communication, frequency of communication, algorithms accounting for frequency and recentness of communications, intimacy, topics of communication, etc.). Intimacy and/or topics of communication may be flagged based on monitoring communications between users for keywords. For example, communications with positive words like the word "love" can be associated with a strong connection between users while communications with negatives words or phrases such as "I hate you" can be associated with a negative connection between users.

This relevant social graph may be utilized to perform actions with respect to social networking and/or communication functions. By way of example, the relevant social graph may be utilized to filter information to present to the user via the social networking application 103. The information may include status updates and feeds, messages, communications between other members of the social graph, a combination thereof, etc. Alternatively or additionally, the information may be ranked and sorted to be presented to the user via the social networking application 103. As such, certain information may be highlighted or otherwise marked to stand out or have higher priority in presentation (e.g., status updates associated with a person that the user has recently had real life contact with).

In certain embodiments, the social networking application 103 can be utilized to generate a master social graph that includes information from multiple other social graphs and/or relationships. For example, the master social graph can include information that a particular person is a friend in a first social networking service, a colleague in another social networking service, and not linked to the user in other social networking services. In another example, another person may be a contact that has contact information stored in a contact list of the UE 101 including relationship status (e.g., wife, husband, family, sister, brother, child, cousin, colleague, employer, friend, classmate, high school classmate, college classmate, acquaintance, etc.). These relationships or social connections may be utilized to group one or more sets of people in the master social graph or other social graphs together. Further, the social graph can be presented to the user by presenting groups of users as further displayed in FIGS. 6A-6D. Moreover, these group presentations can be scrolled across a display as shown in FIGS. 6A-6D (e.g., scrolling across a screen over time, panning across a screen, etc.) or otherwise presented. In certain scenarios, a person may belong to more than one group. For example, a person may be a member of a user's family group and high school group. The people in these groups can further be associated in a social graph based on relationships (e.g., compatibility) with each other (e.g., how much one person likes another person in the social graph or group). These relationships may further be presented via sounds (e.g., sounds indicating sympathy or antipathy) or links between the users (e.g., a link showing magnetism or dislike between the people). The social networking application 103 or social networking platform 107 can determine the compatibility between people by searching user profiles, opinions written in forums, and other observable behavior. For example, two people who agree on opinions and have common user profile elements can be considered compatible.

As shown in FIG. 1, the system 100 comprises a user equipment (UE) 101 having connectivity to social networking platforms 107 and other UEs 101 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UEs 101 and the social networking platforms 107 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
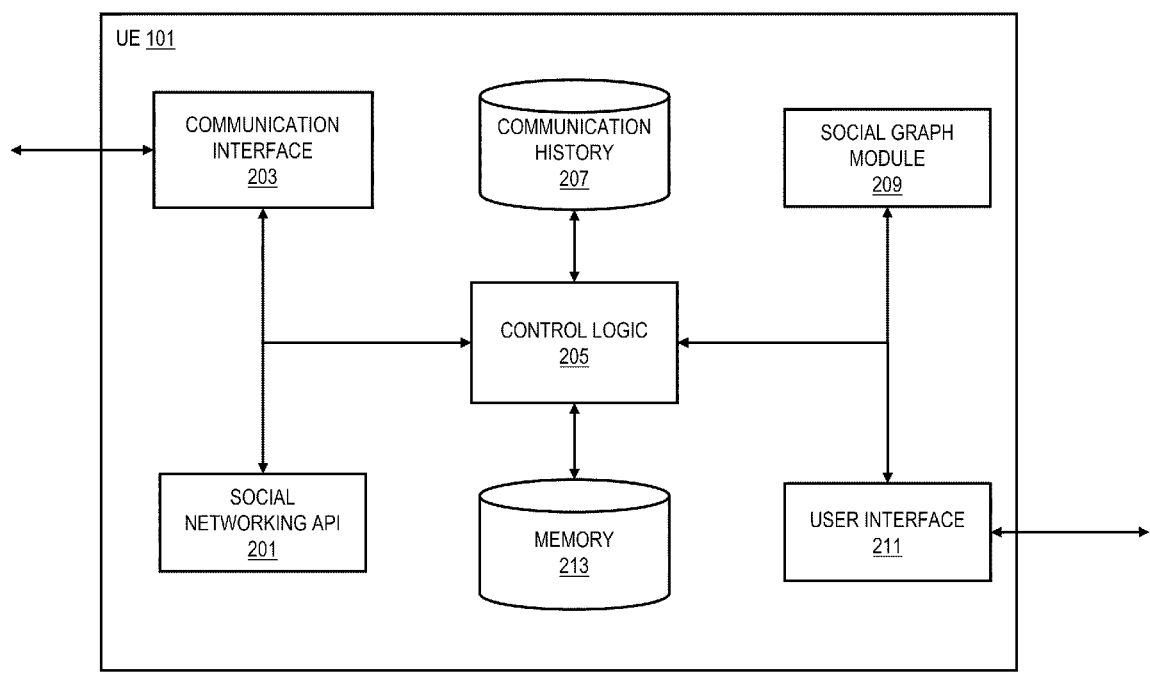
FIG. 2 is a diagram of the components of user equipment capable of generating a relevant social graph, according to one embodiment.

FIG. 2 is a diagram of the components of user equipment capable of generating a relevant social graph, according to one embodiment. It is contemplated that the functions of these components may be combined in one or more components or performed by other components of equivalent functionality. In this embodiment, the UE 101 includes a social networking API 201 to connect to social networking platforms 107, a communication interface 203 to communicate over a network, control logic 205 to control the runtime of applications executing on the UE 101, a communication history 207, a social graph module 209, a user interface 211 to output information and receive input, and a memory 213.

The control logic 205 can run applications (e.g., a social networking application 103) on the UE 101. The applications can be stored in the memory 213 while executing. These application may utilize the user interface 211 to interact with users, a communication interface 203 to interact with other UEs 101 (e.g., via a communication network 105), and a social networking API 201 that may be utilized to interact with the communication interface 203 to interact with social networking platforms 107. The social networking API 201 may be used by the control logic 205 to query the social networking platforms 107 for information (e.g., querying social graphs associated with the user, querying social services to determine whether a person associated with contact information is a member of the social service, etc.). Further, the social networking API 201 may be utilized to receive and format other services from the social networking platforms 107 (e.g., status updates, communications between members of the social networking service, presence information associated with users of the service, etc.).

The communication interface 203 may include multiple means of communication. For example, the communication interface 203 may be able to communicate over SMS, internet protocol, instant messaging, voice sessions (e.g., via a phone network), or other types of communication. The communication interface 203 can be used by the control logic 205 to communicate with other UEs 101, the social networking platforms 107, and other devices. In some examples, the communication interface 203 is used to transmit and receive information using protocols and methods associated with the social networking API 201.

In one embodiment, a UE 101 includes a user interface 211. The user interface 211 can include various methods of communication. For example, the user interface 211 can have outputs including a visual component (e.g., a screen), an audio component, a physical component (e.g., vibrations), and other methods of communication. User inputs can include a touch-screen interface, a scroll-and-click interface, a button interface, etc. In certain embodiments, the user interface 211 may additionally have a vocal user interface component. As such, a text-to-speech mechanism may be utilized to provide textual information to the user. Further, a speech-to-text mechanism may be utilized to receive vocal input and convert the vocal input into textual input. Moreover, the user interface 211 may be utilized to present social networking information as further detailed in the description of FIGS. 6A-6D. As such, the user interface 211 may be utilized to present content associated with the social networking application 103.

In certain embodiments, the social networking application 103 or other applications (e.g., a communication application, messaging application, etc.) execute on the control logic 205 and utilize a communication history 207 and/or social graph module 209 to determine and disseminate social information to the user via the user interface 211. As noted above, the social graph module 209 may be utilized to generate or modify social graphs (e.g., a master social graph, a relevant social graph, etc.) using contact information that may be stored in memory 213, retrieved via the social networking API 201 and/or communication interface 203. As previously noted, contact information may include an e-mail address, a messaging alias identifier, a phone number, an address, etc. Contact information may additionally be acquired via the user interface 211 or via the communication interface 203 (e.g., via the Internet or an SMS) and stored in the memory 213. Further, the social networking API 201 may be invoked to retrieve social graphs from one or more social networking platforms 107 or other devices accessible via the communication network 105.

Further, as the user utilizes the UE 101 to communicate with other users via the user interface 211 and communication interface 203, a communication history 207 is compiled. The communication history 207 reflects the real life communications (e.g., phone calls, calendar appointments, instant messages, SMS, MMS, e-mails, social networking service messages, etc.) the user conducts with other people. In one embodiment, the communication history 207 includes communications that are local to the UE 101 (e.g., a cell phone may have local communications capabilities of telephone calls, SMS, MMS, e-mail, etc.). In other embodiments, the communication history 207 may include social networking service messages from one or more social networking services. Further, the communication history 207 can include fields to determine if communications are incoming, outgoing, or mutual.

The social networking application 103 executing on the control logic 205 may utilize the communication history 207 and social graph module 209 to generate a relevant social graph as discussed above. The relevant social graph can be parsed to determine whether a relevant social graph member is connected to the user in one or more social networking services. For example, the social networking application 103 can determine the connections using the social networking API 201 to query information about the social graph member based on contact information (e.g., name, address, e-mail address, phone number, etc.). As such, in certain embodiments, the social graph module 209 is a means for generating and utilizing a relevant social graph. Further, the control logic 205 may be a means for utilizing the communication history 207 and social graph module 209. For example, the control logic 205 can utilize the communication history 207 to present filtered social information to a user.

Figure 3:
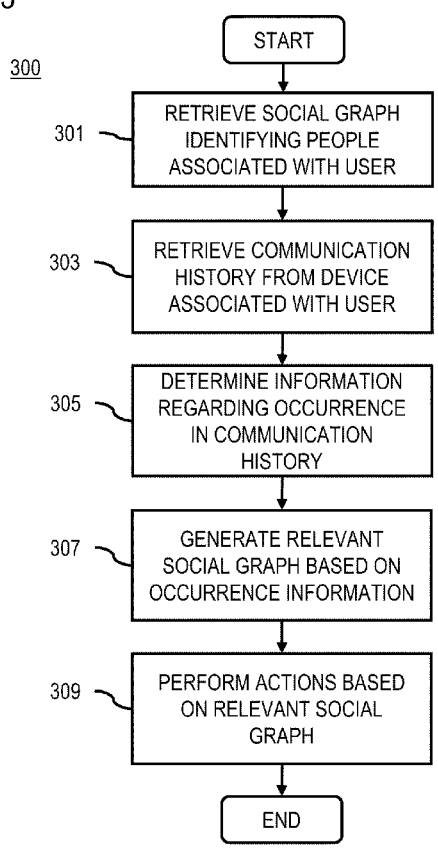
FIG. 3 is a flowchart of a process for generating a relevant social graph, according to one embodiment.

FIG. 3 is a flowchart of a process for generating a relevant social graph, according to one embodiment. In one embodiment, the control logic 205 of the UE 101 performs the process 300 and is implemented in, for instance, a chip set including a processor and a memory as shown FIG. 8. As such, control logic 205 can provide means for accomplishing various parts of the process 300 as well as means for accomplishing other processes in conjunction with other components. In one embodiment, a social networking application 103 can be executed on the control logic 205 to present social networking information, such as social communications, status updates, etc. at the UE 101 (e.g., via a user interface screen). In certain embodiments, the social networking application 103 can be an active application or a background application running on the UE 101. Additionally or alternatively, the social networking application 103 can run as wallpaper in the background of the UE 101.

In step 301, the control logic 205 retrieves a social graph identifying people associated with the user. As previously noted, the social graph may be retrieved via a social networking API 201 from a social networking platform 107 or a memory 213 of the UE 101. The social graph may be generated using user input into the UE 101 and/or contact information. For example, the user can enter relationship information between users while updating or generating the social graph.

At step 303, the control logic 205 retrieves a communication history 207 from the UE 101, which is associated with the user. The user may have personal information stored in the memory 213. Moreover, the communication history 207 can be keyed to the user. The communication history 207 is information that includes the communication information of the user and other people. As previously mentioned, the communications included in the communication history 207 can include e.g., voice sessions such as a phone call, text communications such as a Short Message Service (SMS), Multimedia Messaging Service (MMS), e-mail, chat sessions, video communications, communications via another social networking service, e-mail, chat sessions, video communications, etc. Further, the communication history may include time information as to when the user communicated with a particular person and the type of communication. Moreover, the communication history 207 can include statistics of the communications as well as contact information associated with the people (e.g., a phone number, a messaging alias, a name, etc.).

Then, the control logic 205 provides a means for determining occurrence information regarding a respective occurrence of each identified person in the communication history (step 305). Algorithms may be implemented to determine an occurrence. In certain embodiments, an occurrence is a determination from the communication history that sufficient contact was made between the user and the identified person. For example, an occurrence may be one communication to the identified person, an outgoing communication to the identified person, an incoming communication from the identified person, a set threshold number of communications with the identified person, a set threshold number in the frequency of communication to the identified person, the recentness of communications with the identified person, a combination thereof, or the like.

Further, at step 307, the control logic 205 generates a relevant social graph based, at least in part, on the determined occurrence information. As such, the control logic 205 is a means for generating the relevant social graph. In certain embodiments, a relative social graph is a data structure or group of data structures that stores connection and relationship information between users and/or persons augmented by communications of the user. In this manner, communications modify social graphs of the user to add a real-life aspect to the social graph. The identified people that are part of the occurrences or patterns of the occurrences may be flagged or sorted in the social graph to generate the relevant social graph. Further, the relevant social graph may include the people associated with the social graph and rank each of the people based on the occurrence information (e.g., based on the frequency of communication between the user and the identified person).

Moreover, the relevant social graph can be utilized by the control logic 205 to perform actions (step 309). One action associated with filtering social status feeds is described in FIG. 4. Another action utilizing the relevant social graph is to recommend unidentified persons to the social graph. The control logic can determine information regarding an occurrence in the communication of a person unidentified in the social graph. For example, if the social graph is retrieved from a social networking platform 107, the social graph may include the user's friends or contacts that are also associated with the social networking platform 107, but not include some people or contacts that are not associated with the social networking platform 107, but are included in the communication history. In these cases, when an occurrence is determined, but the person is not part of the social graph (and thus unidentified), the person can be recommended for addition in the social graph. As such, the control logic 205 can generate a request to add the person to the user's social graph on the social networking platform 107. In certain embodiments, this is performed by accessing the social networking platform 107 via the social networking API 201 and/or communication interface 203. The control logic 205 can utilize the social networking API 201 to search the social networking platform 107 for the person using contact information (e.g., name, address, e-mail, phone number, etc.). If the person is a member of the social networking platform 107, but not a member of the user's social graph, the person is invited to join the social graph of the user.

If the person is not part of the social networking platform 107, the control logic 205 generates or creates an invitation to join the social network service on the social networking platform 107. Then, the control logic 205 causes, at least in part, transmission of the invitation to another device associated with the person. The invitation can include information to register for the social networking platform 107 as well as information to add the person to the user's social graph. Further, the control logic 205 can recommend at least one of the identified people (e.g., one of the people in the user's social graph), related content (e.g., media such as video, images, audio associated with one or more of the identified people), or a combination thereof. This may be performed to associate the person with the identified people and thus add to the user's social graph. Further, the information may be utilized to entice the person to accept the invitation and join the social networking service.

Another action that can be performed utilizing the relevant social graph is to determine and present compatibility information among the identified people. Compatibility information can be determined by searching for information on one or more social networks for connections between two people in the social graph. Further, the compatibility information may be determined by ascertaining likes, dislikes, etc. based on, for instance, comparison of information (e.g., profile information, postings, comments, etc.) associated with the identified people on the social networks. Moreover, relationship information (e.g., friend, spouse, best friend, etc.) on a social network may be utilized to determine compatibility information. The control logic 205 can cause, at least in part, presentation of the identified people on a graphical user interface (e.g., via a screen of the UE 101). Compatibility information can then be presented on the graphical user interface (e.g., as links between presented identified people). Further, the compatibility information may be utilized to determine placement of people associated with the user's social graph (e.g., more compatible pairs may be presented in the user interface closer together). Moreover, the people can be displayed on the screen as having a magnetic attraction to one another (e.g., animation may show movement of the graphical representations of the pair as moving towards each other). Dislike between people can be presented in a similar manner (e.g., icons representing the users can be shown in a manner that shows the icons moving away from each other); that is the icons show a repulsion. Further, sounds can be utilized to indicate sympathy, antipathy, or other feelings between users (e.g., pleasant sounds or tones may be played to indicate sympathetic feelings, while discordant sounds may be played for antipathetic feelings). The compatibility information can additionally be utilized to recommend people (e.g., friends) to other people in a social graph (e.g., a master social graph or relevant social graph) of the user.

Figure 4:
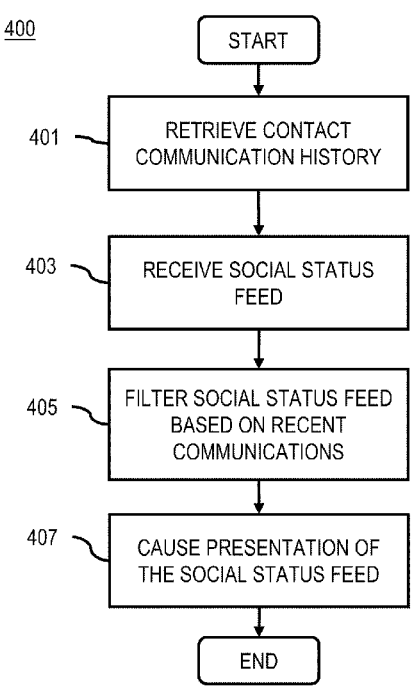
FIG. 4 is a flowchart of a process for filtering a social status feed based on a relevant social graph, according to one embodiment.

FIG. 4 is a flowchart of a process for filtering a social status feed based on a relevant social graph, according to one embodiment. In one embodiment, the control logic 205 of the UE 101 performs the process 400 and is implemented in, for instance, a chip set including a processor and a memory as shown FIG. 8. As such, control logic 205 can provide means for accomplishing various parts of the process 400 as well as means for accomplishing other processes in conjunction with other components. As noted in above, a social networking application 103 can be executing on the control logic 205. As such, social networking information, such as social communications, status updates, etc. may be presented to a user of the UE 101 (e.g., via a screen). Status updates can include a social status feed to update the user of events occurring in the lives of the user's contacts and/or connections.

At step 401, the control logic 205 retrieves a contact communication history 207. Additionally or alternatively, the control logic 205 can generate or retrieve a relevant social graph. The control logic 205 can receive a social status feed or other status information about people in the user's social graph (step 403). The social status feed can be filtered based on the communication history 207. For example, the social status feed can be filtered based on recent communications (step 405). Moreover, the social status feed can be filtered based, at least in part, on the relevant social graph. In one example, the social status feed can be filtered so that only status information associated with people in the relevant social graph is presented. In another example, the social status feed can be sorted so that the communication history 207 (e.g., frequency, volume, or recentness of communications with a particular person) is taken into account when determining which social status feed information is displayed to the user. The status feed can be caused to be presented on a display of the UE 101 (step 407).

Figure 5:
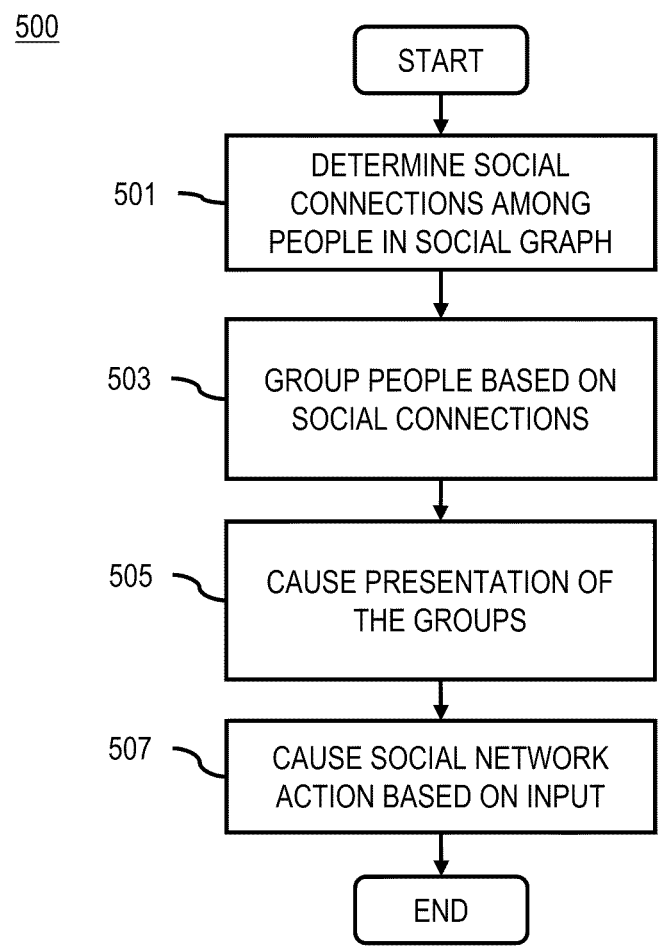
FIG. 5 is a flowchart of a process for presenting groups of social networking members, according to one embodiment.

FIG. 5 is a flowchart of a process for presenting groups of social networking members, according to one embodiment. In one embodiment, the control logic 205 of the UE 101 performs the process 500 and is implemented in, for instance, a chip set including a processor and a memory as shown FIG. 8. As such, control logic 205 can provide means for accomplishing various parts of the process 500 as well as means for accomplishing other processes and may be utilized in conjunction with other components. As noted in above, a social networking application 103 can be executing on the control logic 205. As such, social networking information, such as social communications, status updates, etc. may be presented to a user of the UE 101 (e.g., via a screen).

At step 501, the control logic 205, determines social connections among people identified in a social graph, a relevant social graph, or a combination thereof. This determination may take into account relationships between the people, for example, a connection between two people can be based on information from a social networking platform 107. Further, the people can be grouped based on the social connections (step 503). Moreover, the social graph can include groups that the users may join. For example, the groups can be based on locations, educational groups, special interest groups, employment groups, other groups, etc. Users may join these groups on social networking platforms 107, which the control logic 205 may retrieve, for example, via a social networking API 201.

Figure 6A:
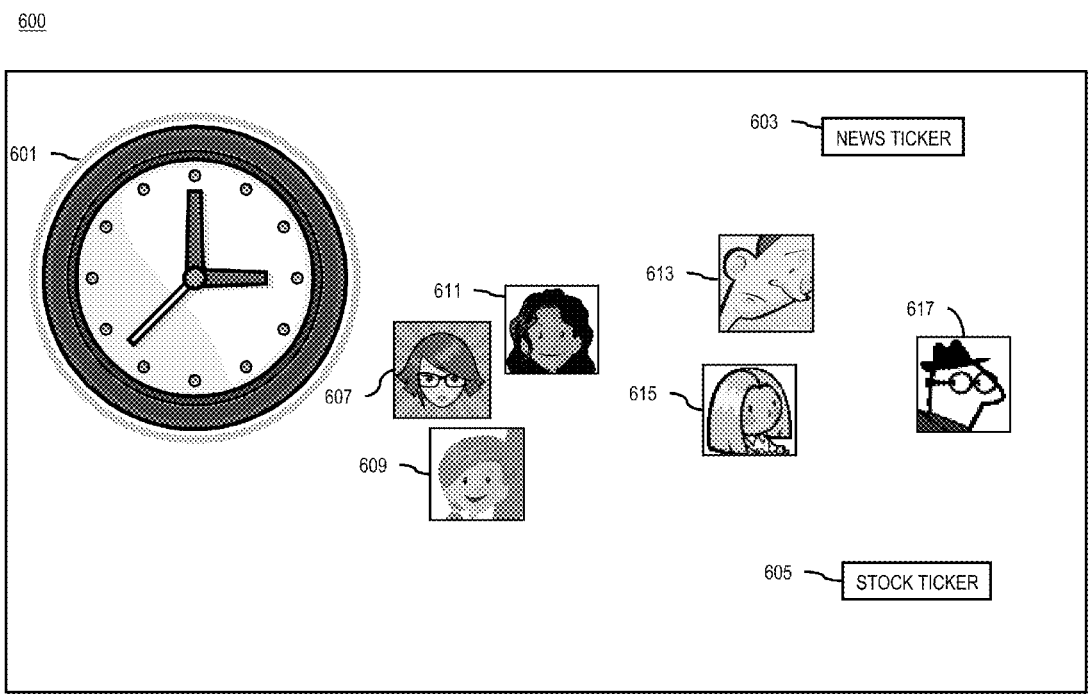
FIGS. 6A-6D are diagrams of user interfaces utilized in the processes of FIGS. 3-5, according to various embodiments.
Figure 6B:
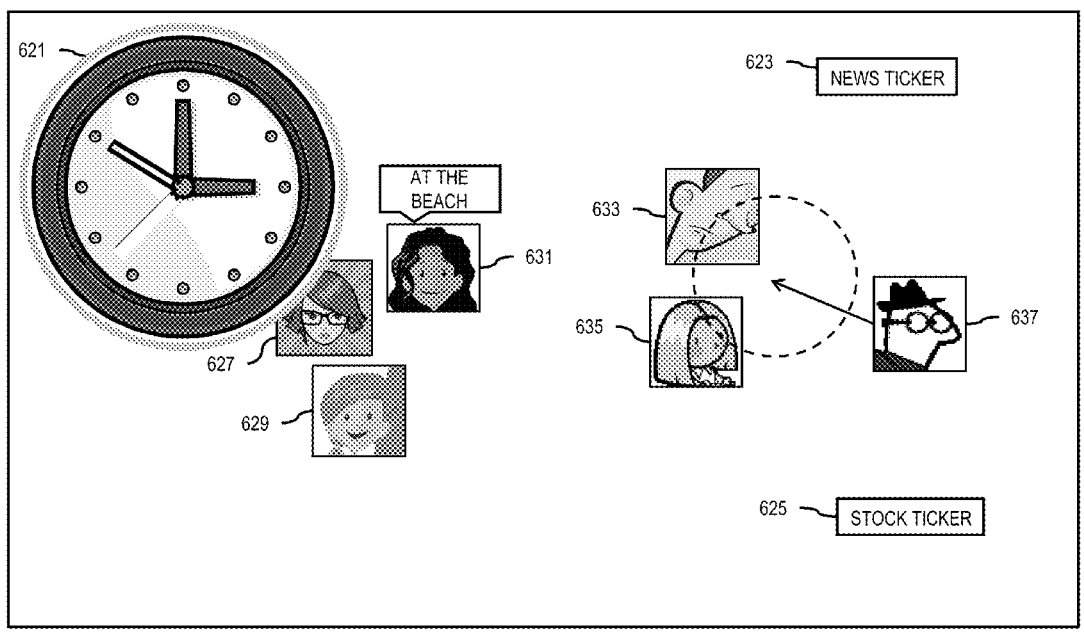
Figure 6C:
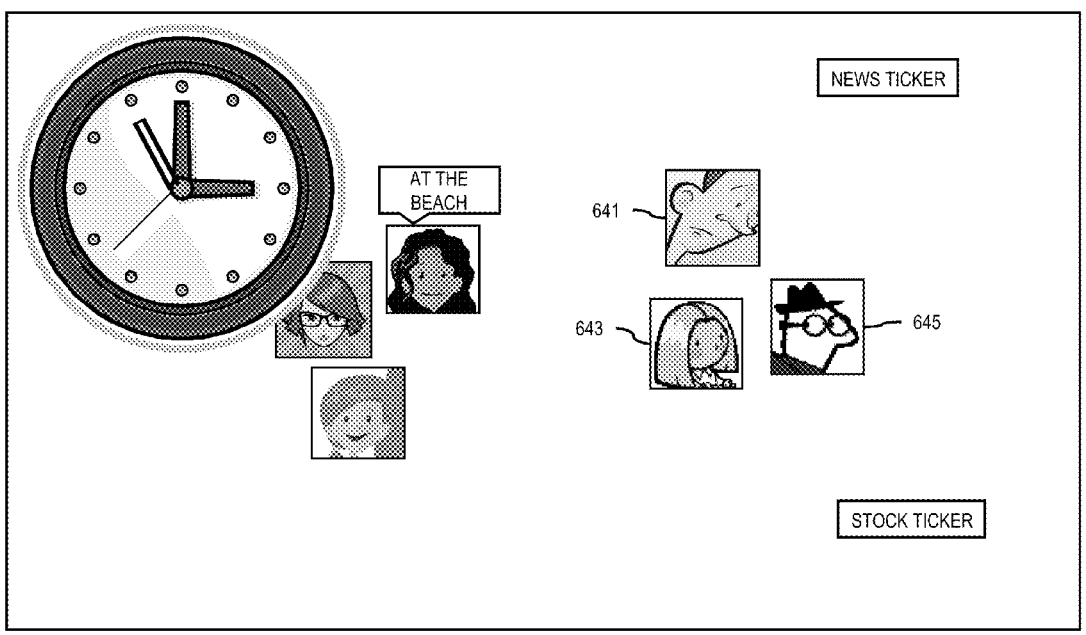

Then, the control logic 205 causes presentation of the groups of people (step 505). Examples of the presentation are shown in FIGS. 6A-6D. The groups of people can be shown as icons (e.g., images associated with one or more of the people) on a display. Further, the groups may be shown as names, identifiers, lists, etc. Then, at step 507, the control logic 205 causes, at least in part, a social network action based on input. As such, the control logic 205 may receive input associating one of the people with a group. The input may be retrieved as shown in FIG. 6B via a scroll and click mechanism, a touch screen, etc. As the person is associated with the group, the control logic 205 can determine whether the person is associated with a social networking service associated with a person that is a member of the group. If the person is associated with the social networking service, the person can be added as a member of the group (e.g., by adding the person in the social networking service via the social networking API 201). If the person lacks association with the social networking service, the control logic 205 can generate an invitation to join the social networking service. The control logic 205 can then cause, at least in part, transmission of the invitation to a UE 101 associated with the person. The transmission may be to a communication identifier (e.g., an e-mail address, a phone number, etc.). Further, the control logic 205 can recommend at least one member of the group for association via the social networking service. Moreover, in this manner, when a person is associated with a group, the users may be associated (e.g., added to) social groups on multiple social networks. Thus, contacts known on a social graph to the user via one service can advantageously be added to social graphs of other services the user is associated with and recommend the other members of the group to the respective contacts.

FIGS. 6A-6D are diagrams of user interfaces utilized in the processes of FIGS. 3-5, according to various embodiments. User interface 600 includes an exemplary interface utilized to present social information to a user. In this exemplary embodiment, the user interface 600 can display a clock 601, a news ticker 603, a stock ticker 605, as well as the social information. The user interface 600 can, in certain embodiments, be part of a background or home screen associated with a presentation of the UE 101. The social information can be displayed as social graphs and/or groups of connections and/or contacts associated with members of the social graph. For example, a first group of social members 607, 609, 611, a second group of social members 613, 615, and a third group consisting of a single social member 617 can be presented to the user. Further, the presentation of the social information can be scrolled so that additional social content can be presented to the user.

As shown in FIG. 6B, the presentation of the members of the social graph on a user interface 620 can be scrolled with time. As the clock 621 turns, the news ticker 623 and stock ticker 625 can be updated. Further, the first group 627, 629, 631, second group 633, 635, and third group 637 are scrolled to the left. As such, the people in the groups are scrolled across the user interface 620 according to a time parameter associated with the clock. A status of a member 631 of the first group 627, 629, 631 can be presented to the user. As previously noted, presentations of the status can be determined based on a relevant social graph or other algorithms. Further, the presentation of members of the social graph on the user interface 620 may be scrolled by interacting with the clock 621 (e.g., by moving back the minute-hand). In this presentation, the UE 101 can store a buffer of previous status histories or can request the status histories from social networking platforms 107 as the clock is set. Further, the clock 621 may be analog, allowing for the dragging of clock hands or digital, where the user may set the clock times and/or manipulate the clock times through minute and/or hour scrolling. Moreover, the clock 621 may include a presentation and manipulation of dates.

Further, a member of one group (e.g., the third group 637) can be associated with another group (e.g., the second group 633, 635). The member's icon of the third group 637 can be dragged to the second group 633, 635 to add the member to the second group 633, 635. As such, in the user interface 640 of FIG. 6C, the second group 641, 643, 645 can add the member 645 that was once a member 645 of the third group. Thus, the second group 641, 643, 645 can grow to include additional members. Further, when the member 645 is added, the social network actions of process 500 are performed to provide to the user. As such, social networking service memberships and associations can be added between the users of the group. Further, groups can be zoomed in on to view additional options. Different modes may additionally be utilized to view social updates or adding people to groups of contacts.

Figure 6D:
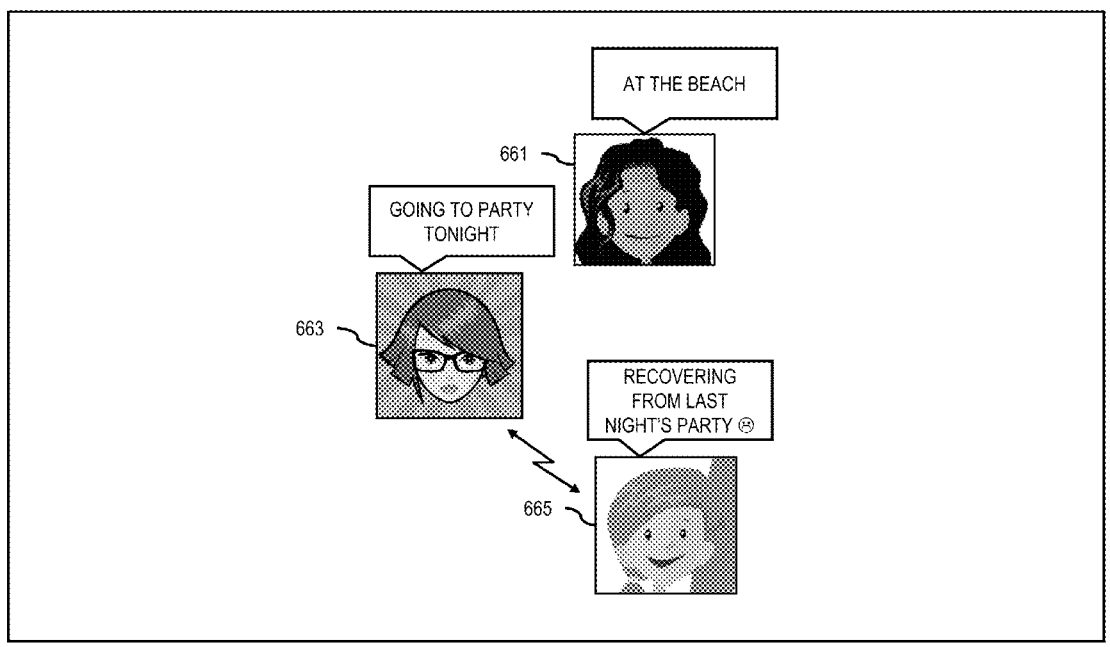

The user interface 660 of FIG. 6D shows a presentation of the zoomed view. Presentation can be shown of status updates and other information associated with the members 661, 663, 665 of the zoomed group. Further, if an individual member is selected, more information (e.g., a member profile) associated with the selected member can be presented. Further, if the selected member is associated with more than one social networking service, a selection may be made to view social information associated with a particular social networking service. Moreover, connections can be presented between members 663, 665. The connection can be invisible on the display, but be shown as a slight attraction between the members 663, 665.

With the above approaches, a relevant social graph can be generated based on communications that a user has with people in the social graph. The relevant social graph can additionally be utilized to filter social information about members of the social graph for presentation to a user. With the presentation of filtered social information, there may be less social information to fetch and present. As such, the UE 101 can preserve processing load, power, and memory space due to the filtering of information because less information needs to be received from social networking platforms 107 (saving network connection power and bandwidth) and less information needs to be presented to the user (saving display power and memory associated with the UE 101). Further, the user can more quickly and efficiently add people to social networks of the user (e.g., by adding a person on the user's social graph to one or more social networks the user is a part of by simply dragging and dropping a person to a social group).

The processes described herein for generating a relevant social graph may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
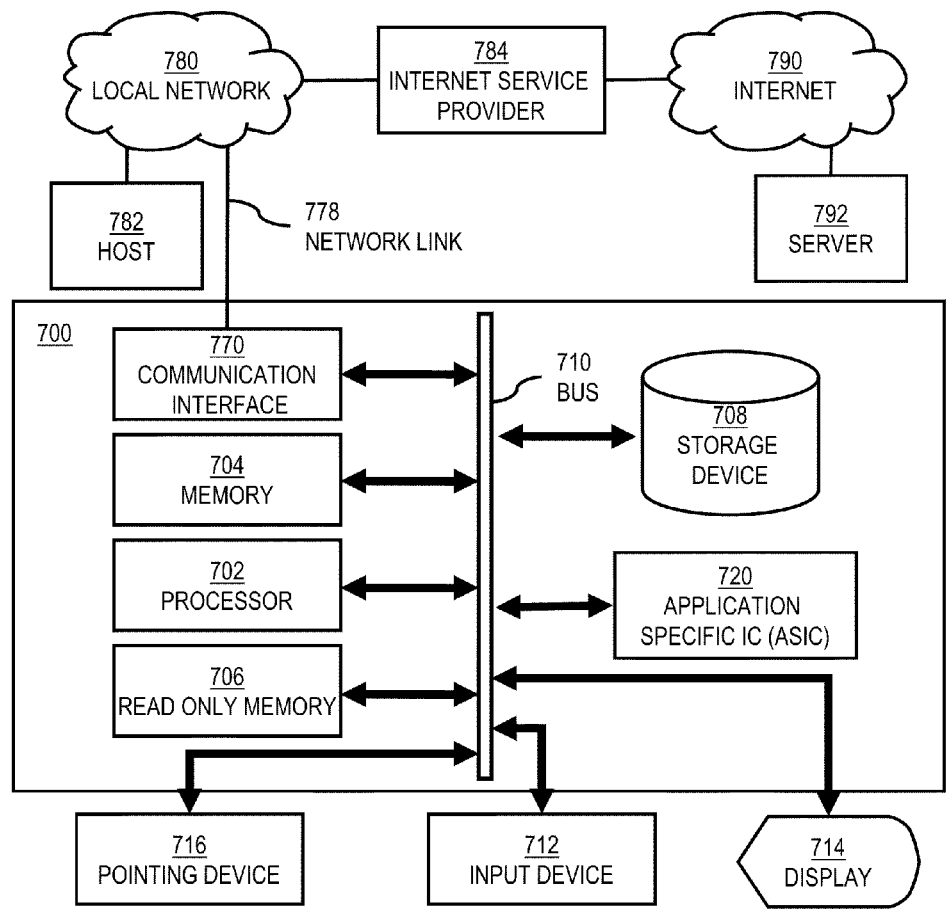
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to generating a relevant social graph as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of generating a relevant social graph.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to generate a relevant social graph. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for generating a relevant social graph. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for generating a relevant social graph, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for the UE 101.

The term "computer-readable medium" as used herein to refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
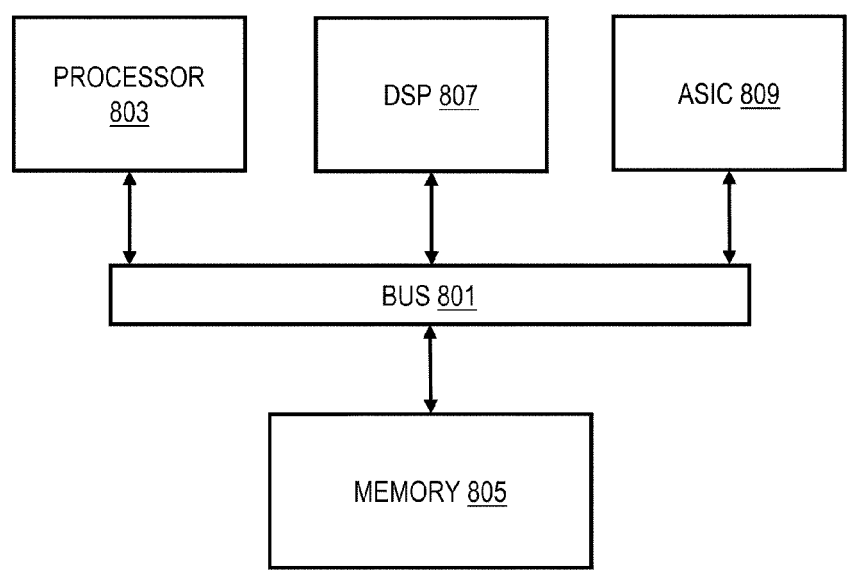
FIG. 8 is a diagram of a chip set that can be used to implement an embodiment of the invention.

FIG. 8 illustrates a chip set 800 upon which an embodiment of the invention may be implemented. Chip set 800 is programmed to generate a relevant social graph as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of generating a relevant social graph.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to generate a relevant social graph. The memory 805 also stores the data associated with or generated by the execution of the inventive steps.

Figure 9:
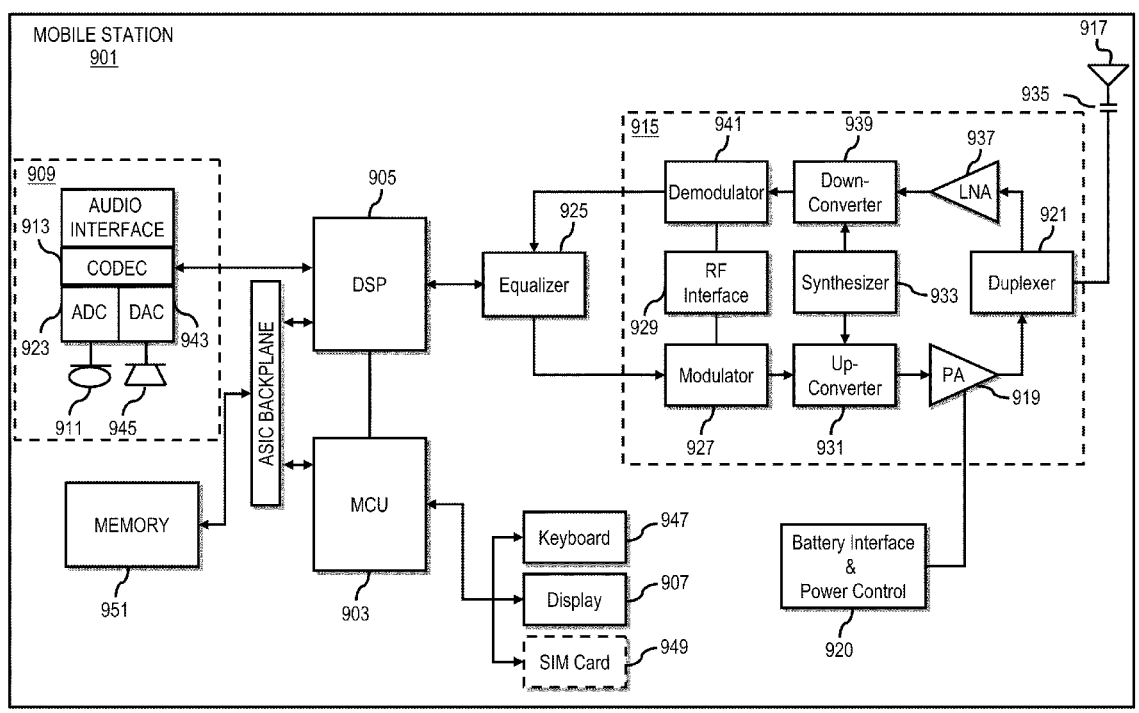
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of generating a relevant social graph. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of generating a relevant social graph. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to generate a relevant social graph. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:
1. A method comprising:
retrieving a social graph identifying people associated with a user;
retrieving a communication history from a communication device associated with the user;
determining, with a control logic, information regarding a respective occurrence of each identified person in the communication history;
generating a relevant social graph based, at least in part, on the determined occurrence information;
determining information regarding an occurrence in the communication history of a person unidentified in the social graph;
recommending the unidentified person for addition to the social graph based, at least in part, on the determined occurrence information;
causing, at least in part, presentation of the identified people on a graphical user interface, wherein the presentation of the identified people includes a status of one or more of the identified people;

causing storing of the status of the one or more of the identified people based on time;

causing, at least in part, scrolling of the identified people across the graphical user interface in a first direction according to a time parameter, wherein the time parameter is changeable by the user to indicate a previous time; and causing, at least in part, scrolling of the identified people across the graphical user interface in a second direction, opposite to the first direction, according to the time parameter being changed by the user to indicate any previous time, wherein the status of the one or more of the identified people is changed to the stored status corresponding to the previous time.

2. A method of claim 1, further comprising:
causing, at least in part, filtering of status feeds from a social networking service based, at least in part, on the relevant social graph.

3. A method of claim 1, further comprising:
determining compatibility information among the identified people; and
causing, at least in part, presentation of the compatibility information as links between the presented identified people, wherein the links are presented as a magnetic force.

4. A method comprising:
retrieving a social graph identifying people associated with a user;
retrieving a communication history from a communication device associated with the user;
determining, with a control logic, information regarding a respective occurrence of each identified person in the communication history;
generating a relevant social graph based, at least in part, on the determined occurrence information;
determining social connections among the people identified in the social graph, the relevant social graph, or a combination thereof;
grouping the identified people based on the social connections;
causing, at least in part, presentation of the groups;
causing, at least in part, presentation of the identified people on a graphical user interface, wherein the presentation of the identified people includes a status of one or more of the identified people;
causing storing of the status of the one or more of the identified people based on time;
causing, at least in part, scrolling of the identified people across the graphical user interface in a first direction according to a time parameter, wherein the time parameter is changeable by the user to indicate a previous time; and
causing, at least in part, scrolling of the identified people across the graphical user interface in a second direction, opposite to the first direction, according to the time parameter being changed by the user to indicate any previous time, wherein the status of the one or more of the identified people is changed to the stored status corresponding to the previous time.

5. An apparatus comprising:
at least one processor; and
at least one memory including computer program code, the at least one memory and the computer program code configured to, with the at least one processor, cause the apparatus to perform at least the following,
retrieve a social graph identifying people associated with a user;
retrieve a communication history from a device associated with the user;
determine information regarding a respective occurrence of each identified person in the communication history;
generate a relevant social graph based, at least in part, on the determined occurrence information;
determine information regarding an occurrence in the communication history of a person unidentified in the social graph;
recommend the unidentified person for addition to the social graph based, at least in part, on the determined occurrence information;
create an invitation to join at least one social networking service;
cause, at least in part, presentation of the identified people on a graphical user interface, wherein the presentation of the identified people includes a status of one or more of the identified people;
cause storing of the status of the one or more of the identified people based on time;
cause, at least in part, scrolling of the identified people across the graphical user interface in a first direction according to a time parameter, wherein the time parameter is changeable by the user to indicate a previous time; and
cause, at least in part, scrolling of the identified people across the graphical user interface in a second direction, opposite to the first direction, according to the time parameter being changed by the user to indicate any previous time, wherein the status of the one or more of the identified people is changed to the stored status corresponding to the previous time.

6. An apparatus of claim 5, wherein the apparatus is further caused, at least in part, to:
cause, at least in part, filtering of status feeds from a social networking service based, at least in part, on the relevant social graph.

7. An apparatus of claim 5, wherein the apparatus is further caused, at least in part, to:
determine compatibility information among the identified people; and
cause, at least in part, presentation of the compatibility information as links between the presented identified people, wherein the links are presented as a magnetic force.

8. An apparatus comprising:
at least one processor; and
at least one memory including computer program code, the at least one memory and the computer program code configured to, with the at least one processor, cause the apparatus to perform at least the following,
retrieve a social graph identifying people associated with a user;
retrieve a communication history from a device associated with the user;
determine information regarding a respective occurrence of each identified person in the communication history;
generate a relevant social graph based, at least in part, on the determined occurrence information;
determine social connections among the people identified in the social graph, the relevant social graph, or a combination thereof;
group the identified people based on the social connections;
cause, at least in part, presentation of the groups;

cause, at least in part, presentation of the identified people on a graphical user interface, wherein the presentation of the identified people includes a status of one or more of the identified people;
cause storing of the status of the one or more of the identified people based on time;
cause, at least in part, scrolling of the identified people across the graphical user interface in a first direction according to a time parameter, wherein the time parameter is changeable by the user to indicate a previous time; and
cause, at least in part, scrolling of the identified people across the graphical user interface in a second direction, opposite to the first direction, according to the time parameter being changed by the user to indicate any previous time, wherein the status of the one or more of the identified people is changed to the stored status corresponding to the previous time.

9. A non-transitory computer-readable storage medium carrying one or more sequences of one or more instructions which, when executed by one or more processors, cause an apparatus to at least perform the following steps:
retrieving a social graph identifying people associated with a user;
retrieving a communication history from a device associated with the user;
determining information regarding a respective occurrence of each identified person in the communication history;
generating a relevant social graph based, at least in part, on the determined occurrence information;
determining information regarding an occurrence in the communication history of a person unidentified in the social graph;
recommending the unidentified person for addition to the social graph based, at least in part, on the determined occurrence information;
causing, at least in part, presentation of the identified people on a graphical user interface, wherein the presentation of the identified people includes a status of one or more of the identified people;
causing storing of the status of the one or more of the identified people based on time;
causing, at least in part, scrolling of the identified people across the graphical user interface in a first direction according to a time parameter, wherein the time parameter is changeable by the user to indicate a previous time; and
causing, at least in part, scrolling of the identified people across the graphical user interface in a second direction, opposite to the first direction, according to the time parameter being changed by the user to indicate any previous time, wherein the status of the one or more of the identified people is changed to the stored status corresponding to the previous time.

10. A non-transitory computer-readable storage medium of claim 9, wherein the apparatus is caused, at least in part, to further perform:
causing, at least in part, filtering of status feeds from a social networking service based, at least in part, on the relevant social graph.

11. A method comprising:
retrieving a social graph identifying people associated with a user;
retrieving a communication history from a communication device associated with the user;
determining, with a control logic, information regarding a respective occurrence of each identified person in the communication history;
generating a relevant social graph based, at least in part, on the determined occurrence information;
causing, at least in part, presentation of the identified people on a graphical user interface, wherein the presentation of the identified people includes a status of one or more of the identified people;
causing storing of the status of the one or more of the identified people based on time;
causing, at least in part, scrolling of the identified people across the graphical user interface in a first direction according to a time parameter, wherein the time parameter is changeable by the user to indicate a previous time; and
causing, at least in part, scrolling of the identified people across the graphical user interface in a second direction, opposite to the first direction, according to the time parameter being changed by the user to indicate any previous time, wherein the status of the one or more of the identified people is changed to the stored status corresponding to the previous time.

12. An apparatus comprising:
at least one processor; and
at least one memory including computer program code, the at least one memory and the computer program code configured to, with the at least one processor, cause the apparatus to perform at least the following,
retrieve a social graph identifying people associated with a user;
retrieve a communication history from a device associated with the user;
determine information regarding a respective occurrence of each identified person in the communication history;
generate a relevant social graph based, at least in part, on the determined occurrence information;
cause, at least in part, presentation of the identified people on a graphical user interface, wherein the presentation of the identified people includes a status of one or more of the identified people;
cause storing of the status of the one or more of the identified people based on time;
cause, at least in part, scrolling of the identified people across the graphical user interface in a first direction according to a time parameter, wherein the time parameter is changeable by the user to indicate a previous time; and
cause, at least in part, scrolling of the identified people across the graphical user interface in a second direction, opposite to the first direction, according to the time parameter being changed by the user to indicate any previous time, wherein the status of the one or more of the identified people is changed to the stored status corresponding to the previous time.

* * * * *